United States Patent [19]
Mintzer

[11] Patent Number: 5,991,788
[45] Date of Patent: Nov. 23, 1999

[54] METHOD FOR CONFIGURING AN FPGA FOR LARGE FFTS AND OTHER VECTOR ROTATION COMPUTATIONS

[75] Inventor: Lester Mintzer, Santa Ana, Calif.

[73] Assignee: Xilinx, Inc., San Jose, Calif.

[21] Appl. No.: 08/815,019

[22] Filed: Mar. 14, 1997

[51] Int. Cl.[6] .............................. G06F 7/52; G06F 7/38
[52] U.S. Cl. ........................................ 708/622; 708/440
[58] Field of Search ......... 364/715.011, 726.01–726.07, 364/748.17, 754.03

[56] References Cited

U.S. PATENT DOCUMENTS

| | | | |
|---|---|---|---|
| 3,777,130 | 12/1973 | Croisier et al. | 235/152 |
| 4,680,727 | 7/1987 | White | 364/754.03 |
| 4,970,674 | 11/1990 | White | 364/726.02 |
| 5,033,019 | 7/1991 | White | 364/726.02 |
| 5,339,265 | 8/1994 | Liu et al. | 364/725.01 |
| 5,371,753 | 12/1994 | Adsett | 372/36 |

OTHER PUBLICATIONS

Cooley, James W. and Tukey, John W., Apr. 1965, "An Algorithm for the Machine Calculation of Complex Fourier Series," Math of Comput., vol. 19, pp. 297–301.

New, Bernie, Aug. 17, 1995, "A Distributed Arithmetic Approach to Designing Scalable DSP Chips," EDN, pp. 107–114.

White, Stanley A., Jul. 1989, "Applications of Distributed Arithmetic to Digital Signal Processing: A Tutorial Review," IEEE ASSP Magazine, pp. 4–19.

*Primary Examiner*—Ohuong Dinh Ngo
*Attorney, Agent, or Firm*—Crosby, Heafey, Roach & May; Jeanette S. Harms

[57] ABSTRACT

A method using replication of distributed arithmetic logic circuits and recursive interpolation of reduced angular increments of sine and cosine sum constants in logic look-up tables, permits the computation of vector rotation and large FFTs in a unitary field programmable gate array chip without required off-chip memory for storing constants.

6 Claims, 4 Drawing Sheets

$X_m$ ———————————— $A_m = X_m + X_n$ $X_n$ ———————————— $A_n \simeq (X_m - X_n) W^k$ $W^k = e^{-j\theta k}$ $X_m = X_{mR} + j X_{mI}$
$X_n = X_{nR} + j X_{nI}$

5,991,788

METHOD FOR CONFIGURING AN FPGA FOR LARGE FFTS AND OTHER VECTOR ROTATION COMPUTATIONS

FIELD OF THE INVENTION

The present invention relates generally to the field of digital signal processing (DSP) in field programmable gate arrays (FPGAs) and more specifically to a method of carrying out complex vector rotation computations, such as large fast Fourier transforms (FFTs), in a single FPGA.

BACKGROUND OF THE INVENTION

The use of FPGAs for carrying out high speed DSP arithmetic computations has gained recognition in recent years. FPGAs having architectures which include logic blocks having multiple look-up-table function generators, such as the XC4000™ family of devices from XILINX, Inc., the assignee herein, are particularly suited for such computations. However, many of the important DSP algorithms are multiply-intensive, and even the FPGAs having the largest number of logic blocks, normally can't embed the multiplier circuits and the attendant control and support circuits in a single chip. It becomes incumbent on the designer to choose efficient DSP algorithms and to realize them with efficient circuit designs. The FFT is an outstanding example of an efficient DSP algorithm and distributed arithmetic is a well established design approach that replaces gate-consuming array multipliers with efficient shift and add equivalent circuits that offer comparable performance.

FFT—The discrete Fourier transform (DFT) of a sampled time series is closely related to the Fourier transform of the continuous waveform from which the time samples were taken. The DFT is thus particularly useful for digital power spectrum analysis and filtering. The FFT is a highly efficient procedure for computing the DFT of a time series and was reported by Cooley and Tukey in 1965 ("AN ALGORITHM FOR THE MACHINE CALCULATION OF COMPLEX FOURIER SERIES" by J. W. Cooley and J. W. Tukey, Math of Comput., Vol. 19, pp. 297–301, April 1965).

It takes advantage of the fact that the calculation of the coefficients of the DFT can be carried out interactively, which results in a considerable savings of computation time. If the time series contains $N=2^n$ samples, then for the N Fourier coefficients the FFT entails $2nN=2N \log_2 N$ multiply operations (assuming a radix 2 butterfly). In contrast, the DFT algorithm requires $N^2$ multiply operations. The FFT advantage grows as N increases. Thus an 8 point DFT and FFT require 64 and 48 multiply operations, respectively, while an 8192 point DFT and FFT require $67.1 \times 10^6$ and 212,384 multiply operations, respectively.

Distributed Arithmetic (DA)—Distributed Arithmetic was developed as an efficient computation scheme for digital signal processing (DSP). A United States patent describing this scheme is 1974 (U.S. Pat. No. 3,777,130 issued Dec. 3, 1974 entitled "DIGITAL FILTER FOR PCM ENCODED SIGNALS" by Croisier, D. J. Esteban, M. E. Levilion and V. Rizo. A comprehensive survey of DA applications in signal processing was made by White ("APPLICATIONS OF DISTRIBUTED ARITHMETIC TO DIGITAL SIGNAL PROCESSING: A TUTORIAL REVIEW" by S. A. White, IEEE ASSP Magazine, July 1989).

The distributed arithmetic computation algorithm is now being effectively applied to embed DSP functions in FPGAs, particularly those with coarse-grained look-up table architecture. Practical FIR, IIR and small size FFT designs have been developed. DA enables the replacement of the array multiplier, central to all these applications, with a gate-efficient serial/parallel multiplier with little or no reduction in speed.

DA makes extensive use of look-up tables (LUT's), thereby fully exploiting the LUT-based architecture of the Xilinx and other similarly structured FPGAs. The LUT used in a DA circuit will hereafter be called a DALUT. One can use a minimum set of DALUTs and adders in a sequential implementation to minimize cost. However, speed/cost tradeoffs can be made. Specifically, for higher speed, more DALUTs and adders may be employed. With enough DALUTs and adders, the range of tradeoffs extends to full parallel operation with all input bits applied simultaneously to the DALUTS and an output response generated at each system clock.

Distributed arithmetic differs from conventional arithmetic only in order in which it performs operations. The transition from conventional to distributed arithmetic is illustrated in FIGS. 1, 2 and 3. In FIG. 1 which illustrates conventional arithmetic, the sum of products equation, $S=A\cdot K+B\cdot L+C\cdot M+D\cdot N$ is implemented with 4 serial/parallel multipliers operating concurrently to generate partial products. The full products are then summed in an adder tree to produce the final result, S. The functional blocks of the serial/parallel multiplier shown in the box of FIG. 1 include an array of 2-input AND gates with the A input derived from a parallel to serial shift register and the K input applied bit-parallel to all AND gates. A P bit parallel adder accepts the AND gate outputs addend inputs and passes the sum to an accumulator register. A divide by 2 block feeds back the register output to the augend inputs of the adder. In each clock cycle one bit of the serially organized data (Ai, Bi, Ci, Di) is ANDed with parallel operands (K, L, M, N) and four partial products are generated. Starting with the least significant serial bits, the partial products are stored in the four accumulator registers. On the next clock cycle, the next least significant bits again form partial products which are then added to the scaled by ½ previous partial product. The process repeats on successive clock cycles until the most significant bits have been shifted. When all the partial products, appropriately scaled, have been accumulated, they are fed to the adder array to produce the final output, S. Distributed arithmetic adds the partial products before, rather than after, scaling and accumulating them.

FIG. 2 shows the first embodiment of the distributed arithmetic technique. The number of shift and add circuits is reduced to one and is placed at the output of the array of simple adders, the number of simple adders remains the same. The two-input AND gates now precede the adders.

In a very important class of DSP applications known as linear, time-invariant systems the coefficients (K, L, M and N in our example) are constants. Consequently, the data presented to the shift-and-add circuit; namely, the output of the AND gates and the three simple adders depend only on the four shift register output bits. Replacing the AND gates and simple adders with a 16 word look-up table (DALUT) provides the final form (FIG. 3) of the distributed arithmetic implementation of the sum of products equation.

The DALUT contains the pre-computed values of all possible sums of coefficients weighted by the binary variables of the serial data (A, B, C and D) which previously constituted the second input to the AND gates. Now, with the four serial data sources serving as address lines to the DALUT, the DALUT contents may be tabulated as follows:

| A | B | C | D | address | Content |
|---|---|---|---|---------|---------|
| 0 | 0 | 0 | 0 | 0  | 0 |
| 0 | 0 | 0 | 1 | 1  | N |
| 0 | 0 | 1 | 0 | 2  | M |
| 0 | 0 | 1 | 1 | 3  | M + N |
| 0 | 1 | 0 | 0 | 4  | L |
| 0 | 1 | 0 | 1 | 5  | L + N |
| 0 | 1 | 1 | 0 | 6  | L + M |
| 0 | 1 | 1 | 1 | 7  | L + M + N |
| 1 | 0 | 0 | 0 | 8  | K |
| 1 | 0 | 0 | 1 | 9  | K + N |
| 1 | 0 | 1 | 0 | 10 | K + M |
| 1 | 0 | 1 | 1 | 11 | K + M + N |
| 1 | 1 | 0 | 0 | 12 | K + L |
| 1 | 1 | 0 | 1 | 13 | K + L + N |
| 1 | 1 | 1 | 0 | 14 | K + L + M |
| 1 | 1 | 1 | 1 | 15 | K + L + M + N |

In general, the length or number of words in the DALUT is $2^a$ where "a" is the number of address lines. The width, or number of bits per word cannot be precisely defined; it has an upper limit of b+log2a due to computation word growth where the coefficients are summed, as the content of the DALUT indicates (wherein b is the number of coefficient bits). The width of the table defines the coefficient accuracy and may not match the number of signal bits (e.g., the bits of A, B, C, and D) which define the dynamic range or linearity of the computation process.

Large FFTs in a Single FPGA—Now that the array multiplier has been replaced by a gate-efficient distributed circuit, there remains a second obstacle to overcome before a large size FFT can be practically embedded in a single FPGA, namely, the large memory required for the sine/cosine basis functions. An 8192 point FFT, for example, requires 8192 basis words and a look-up table capacity of 65,536 is needed for 16 bit accuracy. The Xilinx XC4000™ FPGA family with configurable logic blocks (CLBs) articulated as 32×1 look-up tables would require 131072/32 or 4096 CLBS. This number is almost double the CLB capacity (2,304) of the XC4062XL™ chip, currently the largest device in the XC400™ family.

It would be economically advantageous to provide a method for configuring smaller, less costly FPGAs such as the Xilinx XC4025™ device to perform 8192 or larger point FFTs and other vector rotations.

Those having skill in the relevant arts, will recognize that the invention hereinafter disclosed has some aspects which may be considered related to vector rotation iterations used in CORDIC processors, wherein CORDIC stands for Coordinate Rotation Digital Computer as disclosed in U.S. Pat. No. 5,371,753, assigned to Kuenemund et al. The CORDIC algorithm is similar to the invention disclosed in that both compute vector rotations 4096 words and cannot be reduced by any known interpolation scheme. A CORDIC FFT processor cannot be realized in a single FPGA.

SUMMARY OF THE INVENTION

This invention comprises the gate array implementation of the complex multiplication $(x+jy)e-j\theta$ where x and y are rectangular coordinates of a complex vector and $\theta$ is an angle of rotation. Since $\theta$ is expressed as increments of a basic, resolution angle, $\theta o$, it may be written as $k\theta o$, where k is an integer. In many applications, k takes on a multitude of values. In the case of the 8192 point FFT, k assumes 4092 values from 0 to 4091, and $\theta o=2\pi/8192$. There are accordingly, 4096 values of sine and cosine required for the complex multiplication which constitutes the preponderant FFT butterfly load. A single, large sine/cosine look-up table cannot be embedded in the largest FPGA. By decomposing $\theta$ (k) into sums of increasingly smaller angle segments, and by using DA computation techniques, the single large sine/cosine look-up table can be reduced to a set of small tables that can be embedded in a mid-size FPGA, such as the Xilinx XC4025™ device. The reduced DA look-up tables (DALUTS) of TABLE I bear this out. The complex multiply computations are iterative and are performed in pipelined DA stages that are nearly identical save for their look-up tables which reflect the angle segments.

TABLE I

| DALUTS For Up to N + 8192 Point FFT | | | | | | | | | | |
|---|---|---|---|---|---|---|---|---|---|---|
| $X_{eR}$ | $X_{eI}$ | k | $A_{1R}$ | $A_{1I}$ | $A_{2R}$ | $A_{2I}$ | $A_{3R}$ | $A_{3I}$ | $A_{4R}$ | $A_{4I}$ |
| 0 | 0 | 0 | 0 | 0 | 0 | 0 | 0 | 0 | 0 | 0 |
| 0 | 1 | 0 | 0 | 1 | 0 | 1 | 0 | 1 | 0 | 1 |
| 1 | 0 | 0 | 1 | 0 | 1 | 0 | 1 | 0 | 1 | 0 |
| 1 | 1 | 0 | 1 | 1 | 1 | 1 | 1 | 1 | 1 | 1 |
| 0 | 0 | 1 | 0 | 0 | 0 | 0 | 0 | 0 | 0 | 0 |
| 0 | 1 | 1 | 0.3827 | 0.9239 | 0.0491 | 0.9988 | 0.0061 | 1 | 0.0008 | 1 |
| 1 | 0 | 1 | 0.9239 | −0.3827 | 0.9988 | −0.0491 | 1 | −0.0061 | 1 | −0.0008 |
| 1 | 1 | 1 | 1.3066 | 0.5412 | 1.0479 | 0.9497 | 1.0061 | 0.9939 | 1.0008 | 0.9992 |
| 0 | 0 | 2 | 0 | 0 | 0 | 0 | 0 | 0 | 0 | 0 |
| 0 | 1 | 2 | 0.707 | 0.7070 | 0.0980 | 0.9952 | 0.0123 | 0.999 | 0.0015 | 1 |
| 1 | 0 | 2 | 0.707 | −0.7070 | 0.9952 | −0.0980 | 0.9999 | −0.0123 | 1 | −0.0015 |
| 1 | 1 | 2 | 1.414 | 0 | 1.0932 | 0.8972 | 1.0122 | 0.9876 | 1.0015 | 0.9985 |
| 0 | 0 | 3 | 0 | 0 | 0 | 0 | 0 | 0 | 0 | 0 |
| 0 | 1 | 3 | 0.9239 | 0.3827 | 0.1467 | 0.9892 | 0.0184 | 0.9998 | 0.0023 | 1 |
| 1 | 0 | 3 | 0.3827 | −0.9239 | 0.9892 | −0.1467 | 0.9998 | −0.0184 | 1 | −0.0023 |
| 1 | 1 | 3 | 1.3066 | −0.5412 | 1.1359 | 0.8425 | 1.0182 | 0.9814 | 1.0023 | 0.9977 |
| 0 | 0 | 4 | 0 | 0 | 0 | 0 | 0 | 0 | 0 | 0 |
| 0 | 1 | 4 | 1 | 0 | 0.1951 | 0.9808 | 0.0245 | 0.9997 | 0.0031 | 1 |
| 1 | 0 | 4 | 0 | −1 | 0.9808 | −0.1951 | 0.9997 | −0.0245 | 1 | −0.0031 |
| 1 | 1 | 4 | 1 | −1 | 1.1759 | 0.7857 | 1.0242 | 0.9752 | 1.0031 | 0.9969 |
| 0 | 0 | 5 | 0 | 0 | 0 | 0 | 0 | 0 | 0 | 0 |
| 0 | 1 | 5 | 0.9239 | −0.3827 | 0.2430 | 0.9700 | 0.0307 | 0.9995 | 0.0038 | 1 |
| 1 | 0 | 5 | −0.3827 | −0.9239 | 0.0700 | −0.2430 | 0.9995 | −0.0307 | 1 | −0.0038 |

TABLE I-continued

| | | | | | | | | | | |
|---|---|---|---|---|---|---|---|---|---|---|
| 1 | 1 | 5 | 0.5412 | −1.3066 | 1.2130 | 0.7270 | 1.0302 | 0.9688 | 1.0038 | 0.9962 |
| 0 | 0 | 6 | 0 | 0 | 0 | 0 | 0 | 0 | 0 | 0 |
| 0 | 1 | 6 | 0.7070 | −0.7070 | 0.2903 | 0.9569 | 0.0368 | 0.9993 | 0.0046 | 1 |
| 1 | 0 | 6 | −0.7070 | −0.7070 | 0.9569 | −0.2903 | 0.9993 | −0.0368 | 1 | −0.0046 |
| 1 | 1 | 6 | 0 | −1.414 | 1.2472 | 0.6666 | 1.0361 | 0.9625 | 1.0046 | 0.9954 |
| 0 | 0 | 7 | 0 | 0 | 0 | 0 | 0 | 0 | 0 | 0 |
| 0 | 1 | 7 | 0.3827 | −0.9239 | 0.3369 | 0.9415 | 0.0429 | 0.9991 | 0.0054 | 1 |
| 1 | 0 | 7 | −0.9239 | −0.3827 | 0.9415 | −0.3369 | 0.9991 | −0.0429 | 1 | −0.0054 |
| 1 | 1 | 7 | −0.5412 | −1.3066 | 1.2784 | 0.6046 | 1.0420 | 0.9562 | 1.0054 | 0.9946 |

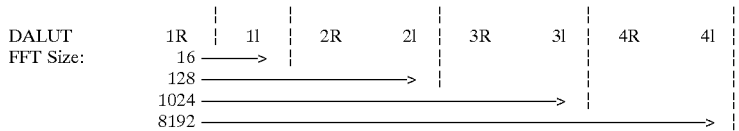

```
DALUT        1R    |  1I   |  2R    2I  |  3R     3I  |  4R     4I
FFT Size:    16 ─────>
             128 ────────────────>
             1024 ──────────────────────────────>
             8192 ────────────────────────────────────────────>
```

OBJECTS OF THE INVENTION

It is therefore a principal object of the present invention to provide a method for configuring a unitary FPGA to carry out large fast Fourier transforms without requiring off-chip sine/cosine memory.

It is another object of the invention to provide a method for configuring a unitary FPGA with a look-up-table to facilitate the computation of the complex products of vector rotation operations involving a large number of angle values between 0 and $2\pi$ radians.

It is still another object of the invention to provide a successive interpolation method for carrying out butterfly computations so that a sine/cosine look-up table and distributed arithmetic circuits could all be embedded in a unitary FPGA and produce large, fast Fourier transforms.

It is still another object of the invention to provide a successive interpolation method for carrying out complex multiplication computations so that a sine/cosine look-up table and distributed arithmetic circuits could all be embedded in a unitary FPGA and produce vector rotations.

BRIEF DESCRIPTION OF THE DRAWINGS

The aforementioned objects and advantages of the present invention as well as additional objects and advantages thereof will be more fully understood hereinafter as a result of the detailed description of a preferred embodiment when taken in conjunction with the following drawings in which.

DETAILED DESCRIPTION OF THE DRAWINGS

The Radix 2 Butterfly

Figure 1:
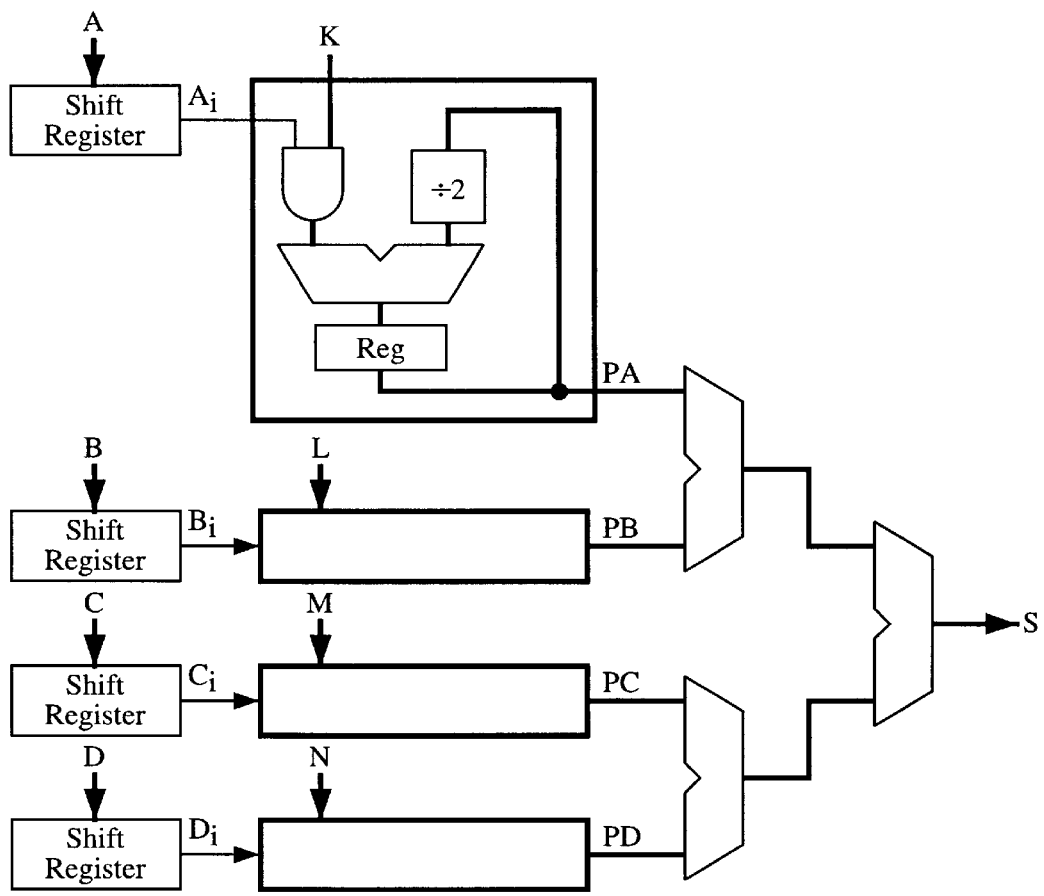
FIG. 1 is a block diagram of a conventional four-product multiply and accumulate circuit.
Figure 3:
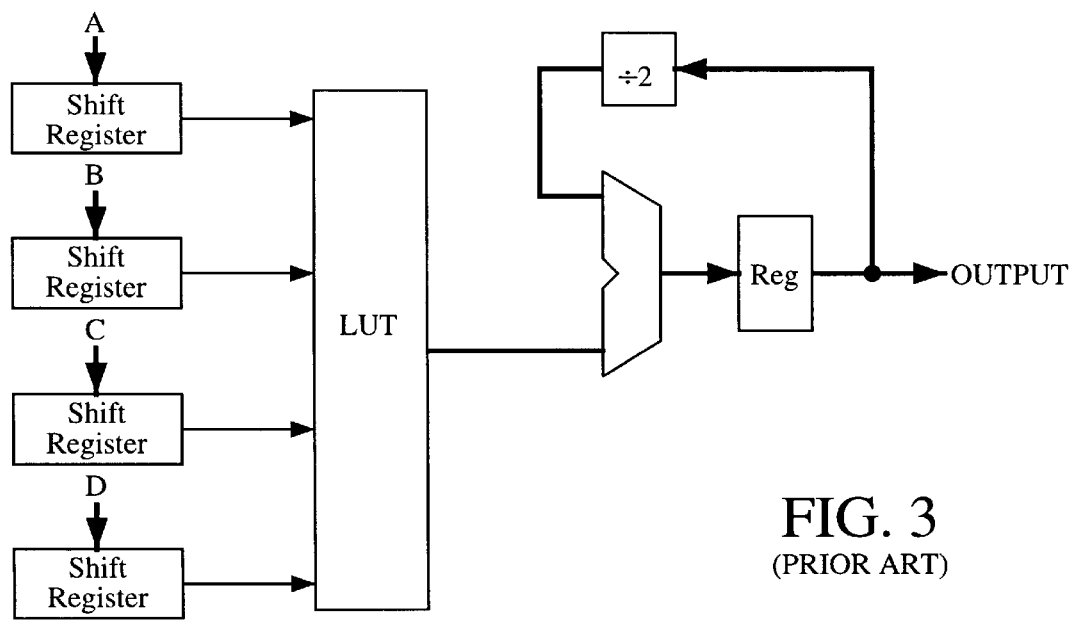
FIG. 3 is a block diagram of a multiply and accumulate circuit in which a look-up-table replaces AND gates and adders of the circuit of FIG. 2.
Figures 2, 4:
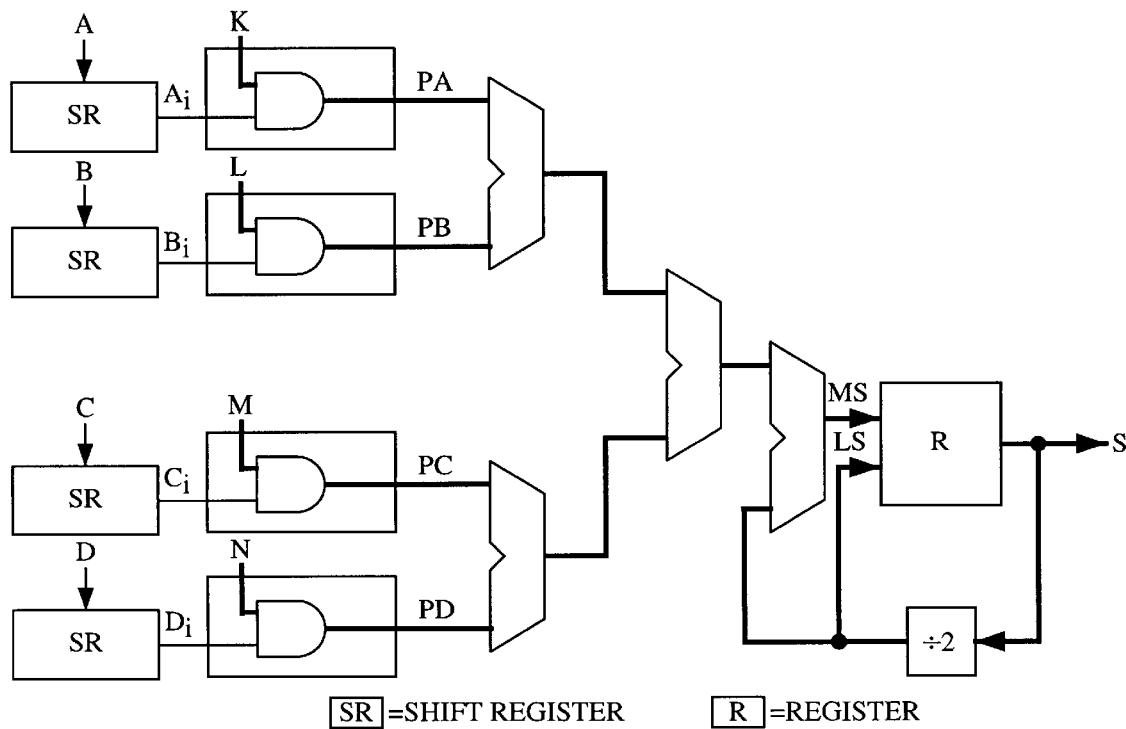
FIG. 2 is a block diagram of the multiply and accumulate circuit of FIG. 1, but reorganized to reduce the number of shift and add operations.
FIG. 4 is an FFT Radix 2 Butterfly diagram or computation flow diagram referred to as a Butterfly computation because of the shape of the diagram.

The invention may be understood by first referring to the radix 2 butterfly of FIG. 4. It should be noted, however, that for large transforms, higher order radices (e.g. 4 or 8) may offer greater efficiency—these, too, are amenable to DA implementation. The radix 2 butterfly computations can be expressed as follows:

$$A_m = X_m + X_n = X_{Rm} + X_{Rn} + j[X_{Im} + X_{In}] \quad \text{(Equation 1a)}$$

$$A_n = (X_m - X_n)W^k; \quad W^k = e^{-j2\pi k/N} N = 2^k \quad \text{(Equation 1b)}$$

expanding $W^k$;

where $X_m$ and $X_n$ are complex input variables and $A_m$ and $A_n$ are the products of the butterfly configurations.

$$W^k = (e^{-j2\pi/N})^k = \cos\Theta_k - j\sin\Theta_k; \quad \Theta_k = 2\pi k/N \quad \text{(Equation 2)}$$

By substituting Equation 2 into Equation 1b, a sum of products expression amenable to DA solution can be observed in Equation 3b below.

$$A_n = (X_{Rm} - X_{Rn})\cos\Theta_k + (X_{Im} - X_{In})\sin\Theta_k + j[(X_{Rm} - X_{Rn})(-\sin\Theta_k) + (X_{Im} - X_{In})\cos\Theta_k] \quad \text{(Equation 3)}$$

Distributed Arithmetic

The sum-of-products (or vector dot product) equation wherein each term has a constant (e.g. coefficient) and variable (data) factors, defines the response of linear, time-invariant networks. Notable examples are FIR, and IIR filters and the discrete Fourier transform (DFT) and its efficient offspring the fast Fourier transform (FFT). Distributed arithmetic is a scheme for computing this sum-of-products without resorting to a full array multiplier. The derivation of the DA algorithm and a FIR filter design example is presented in an article entitled "A DISTRIBUTED ARITHMETIC APPROACH TO DESIGNING SCALABLE DSP CHIPS" by Bernie New in EDN magazine, page 107, Aug. 17, 1995. The multiplier is replaced by shift and add operations—a computation that is serial by multiplier bit (data) and parallel by multiplicand word (the constant factors). This technique is, of course, reminiscent of the software multiply technique of early computers. All of the serially multiplied product terms are computed concurrently; i.e., the partial product is the sum of the partial products of all the terms. The arithmetic sum of all partial products, namely, the sum of all the constant factors logically ANDed with their respective multiplier bits (1's and 0's) for all possible combinations of the multiplier bits is stored in a DALUT. A single DALUT serves all multiplier bits. Starting with the least significant data bits the DALUT is addressed and its contents stored in an accumulator register. The next significant bits address the same DALUT and its new contents are now added to one-half the previously stored value. The process repeats until the sign bits address the DALUT; its contents are subtracted from the stored sum yielding the response of the network. Thus, DA offers the gate efficiency of a serial implementation with performance approaching that of an array multiplier accumulator chip.

Figure 5:
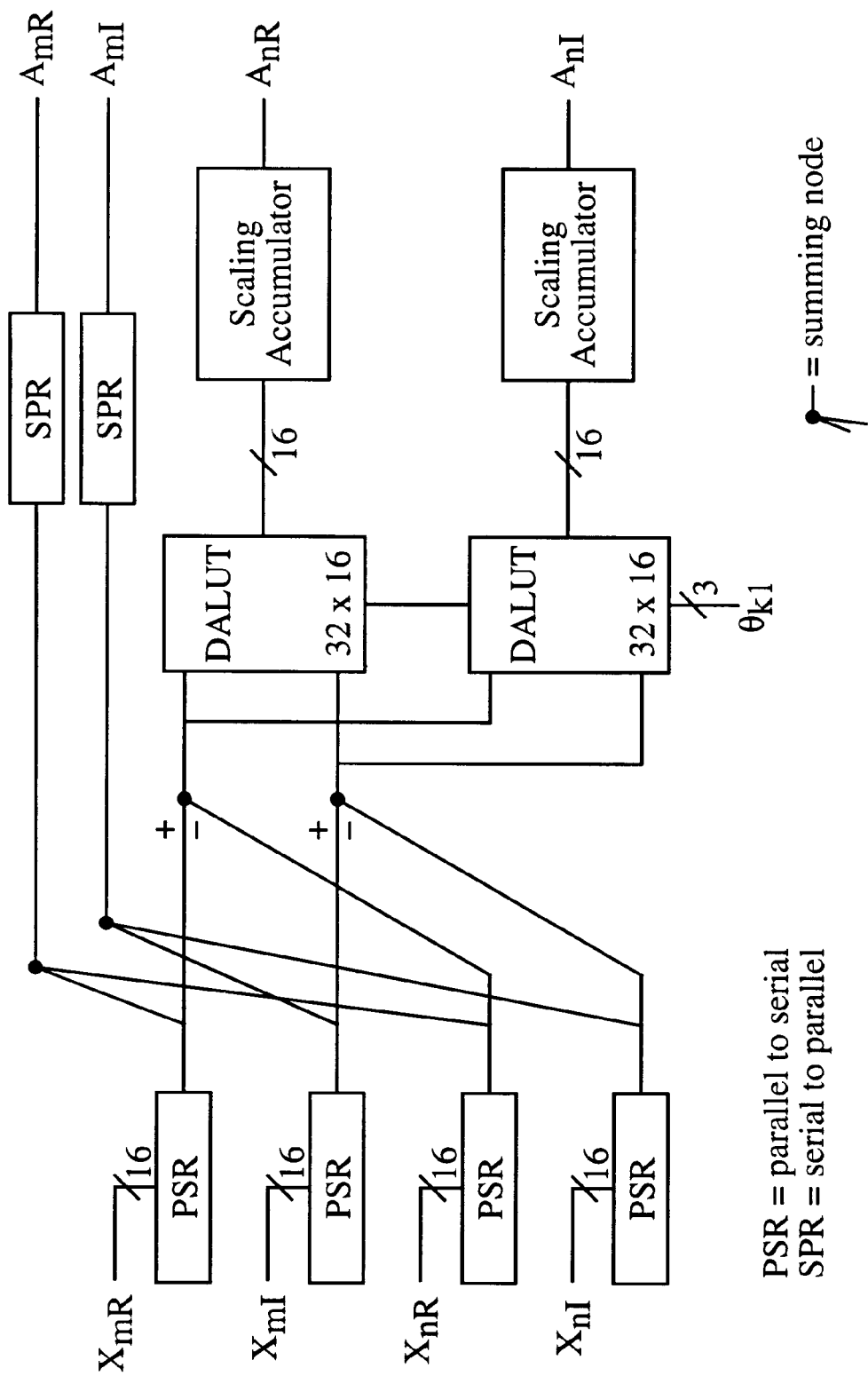
FIG. 5 is a block diagram of the distributed arithmetic data path blocks of an FPGA for computing a Radix 2 Butterfly for a 16 point FFT.

The dot product structure amenable to DA solution can be discerned in Equation 3. The x's are the input variables and the $\sin\Theta_k$, $\cos\Theta_k$ represent the constant factors. If $X_R=(X_{Rm}-X_{Rn})$ and $X_I=(X_{Im}-X_{In})$ and both serve as address inputs to the DALUT, then the DALUT for the real component of Equation 3b contains all possible combinations of $X_{Rb}\cos\Theta_k+X_{Ib}\sin\Theta_k$ while the DALUT for the imaginary component contains all possible combinations of $X_{Rb}(-\sin\Theta_k)+X_{Ib}\cos\Theta_k$. Here the Xb's denote the multiplier bit values. Thus, for each value of k there are 4 words stored in each DALUT. Consequently, the 32 word CLB can provide the partial product contents for 8 values of $\Theta$, i.e., k=0, 1 . . . , 7 —a 16 point FFT. The DA functional blocks for this 16 point FFT butterfly computer are shown in FIG. 5. The functional blocks consisting of serial adders and subtractors, parallel adders, shift registers, parallel-to-serial-registers, and truth tables (DALUTs) can all be readily configured in Xilinx CLBs. Excluding routing constraints, a total of 104 CLBs is needed. With a 50 MHZ system clock and 16 bit data, a butterfly is computed in 320 nsecs. And with N/2 log2N butterflies per FFT, the 16 point FFT can be computed in 10.24 usecs.

Large FFTs

The values of $\Theta_k$ cover the range of 0 to $\pi$ in increments of $2\pi/N$. Thus the 16 point FFT requires only 8 sin/cos values. These values are easily accommodated in a 32 word DALUT by allocating 3 address bits to $\Theta_k$ and 2 address bits to the real and imaginary data components. The $\Theta_k$ address bits cannot be scaled up without an exponential increase in DALUT size. However, by successive interpolation with increasingly smaller increments the DALUT is reduced to manageable size for even 8192 point FFTs. Let $\Theta_k=\Theta_{k1}+\Theta_{k2}+\Theta_{k3}+ . . . +\Theta kp$ with 8 values for each term; i.e., k=0–7 where $\Theta_{k1}$ covers 0 to $\pi$ in $\pi/8$ increments; $\Theta_{k2}$ covers 0 to $\pi/8$ in $\pi/64$ increments; $\Theta_{k3}$ covers 0 to $\pi/64$ in $\pi/512$ increments, etc.

The complex multiply, Equation 1b, now becomes: $(((\ldots((X_m-X_n)e^{-j\Theta k1})e^{-j\Theta k2}) \ldots )e^{-j\Theta kp}$. This recursive expression can be implemented as a set of pipelined DA stages similar to the 16 point FFT (FIG. 5). A 16 bit data path (and sin/cos constants) and control functions can be realized with less than 100 CLBs per stage. An 8192 point FFT with 4096 values of $\Theta_k$ (12 address bits) requires only 12/3 or 4 stages—less than one half the CLB capacity of the Xilinx XC4025™ FPGA having 1024 CLBs. While one additional DA stage provides the capability to compute a 64K point FFT, the word growth due to computation gain and coefficient accuracy may set this as the practical upper limit for the Xilinx XC4025™ chip. However, there are presently several FPGAs having larger CLB capacity including the Xilinx XC4036EX™, XC4044EX™, XC4052XL™ and XC4062XL™ devices, as examples.

Figure 6:
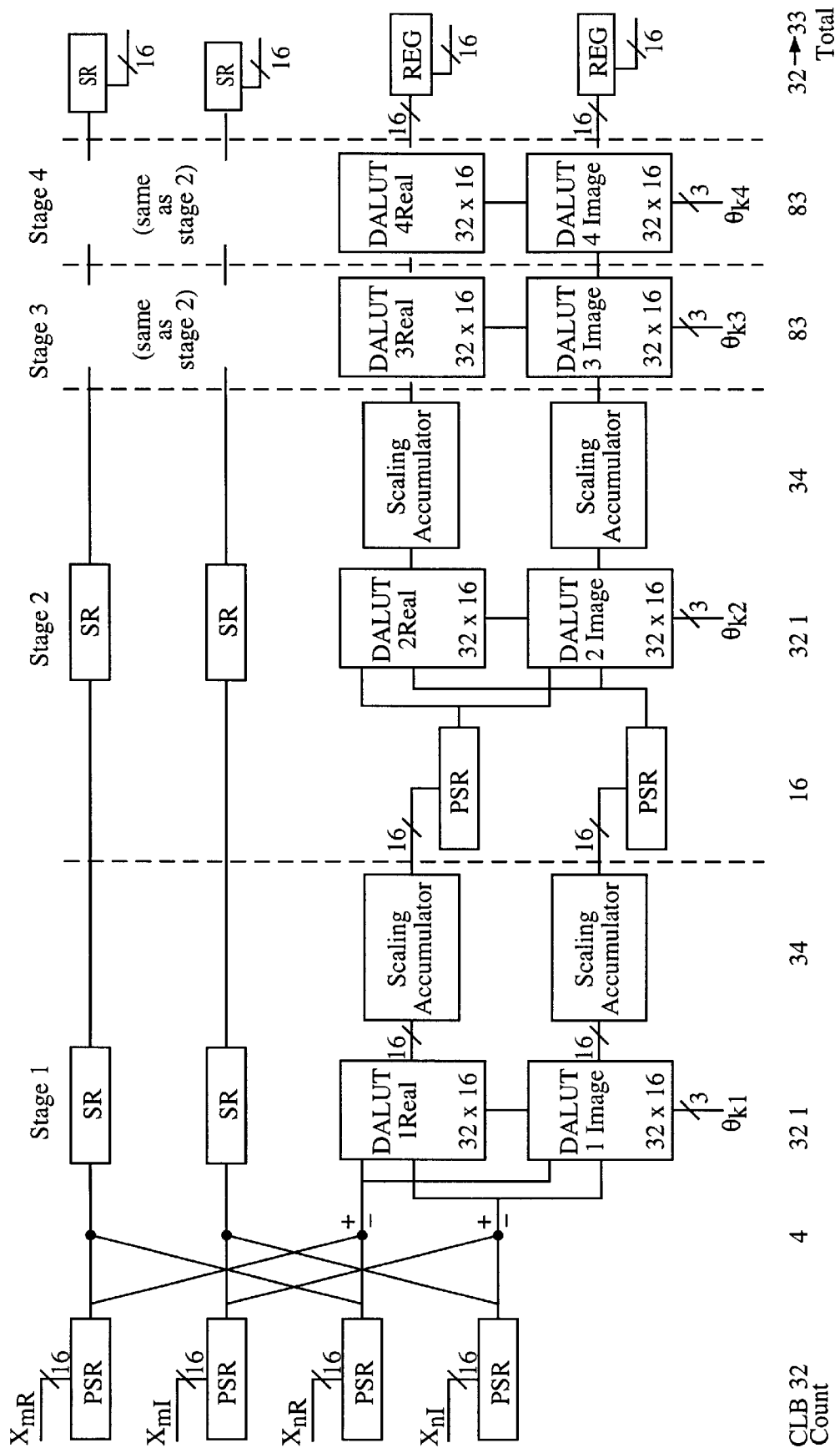
FIG. 6 is a block diagram of the distributed arithmetic data path blocks of a FPGA for computing a Radix 2 Butterfly for a 8,192 point FFT.

The data path functional blocks of the 4 stages are shown in FIG. 6. By using flip-flop registers resident in the CLBs, the combinational data flow can be limited to two CLB stages, thereby minimizing interstage timing uncertainties. The CLB count for each stage is indicated. With the total less than 400 CLBs, there are ample gate resources available for all system timing and data path controls as well as all off-chip data buffer address generation.

The basic computation for each successive interpolation stage of FIG. 6 is:

$A_R = X_R \cos\Theta_k + X_I \sin\Theta_k$ $A_I = X_I \cos\Theta_k - X_R \sin\Theta_k$ where the first stage is defined by Equation 3 wherein $X_R=X_{Rm}-X_{Rn}$ and $X_I=X_{Im}-X_{In}$. For all other stages, the x's are the outputs of preceding stages. With pipelining and with limited combination propagation delays, the 50 MHZ system clock can be retained with the same 320 nsec butterfly computation as the 16 point FFT. Thus, an 8192 point FFT can be computed in 17 msecs.

Distributed Arithmetic, when applied to replace array multipliers and to reduce trigonometric look-up tables by a novel successive interpolation scheme, affords a designer the opportunity to embed large FFTs in a single FPGA. Furthermore, these techniques may also be applied to the synthesis of precision sinusoids and to the design of complex mixers. It will now be understood that the present invention comprises a novel method for performing certain complex computations in FPGAs and other digital signal processing devices. A single FPGA configured for performing large (i.e., N=8,192) FFTs has been disclosed and is implemented by use of a series of successive interpolations with increasingly smaller angular increments for storing values and sums of trigonometric constants in look-up-tables. It will be also understood that the disclosed embodiments are of an exemplary nature and that the inventive method is conducive to even larger and more complex computations not explicitly disclosed herein. Accordingly, the present invention is to be limited only by the appended claims and their equivalents.

I claim:

1. A method for configuring a field programmable gate array (FPGA) for carrying out a complex multiplication of the type $(X_m-X_n)e^{-j\Theta(k)}$ where $X_m$ and $X_n$ are complex input variables and $\Theta(k)=2\pi k/N$ where N is a predetermined integer, the FPGA having an array of distributed arithmetic look-up-tables addressed by multiplier bits; the method comprising the following steps:

a) dividing said FPGA into at least four pipelined stages;

b) loading said look-up-tables with the sums of sin $\Theta$ and cos $\Theta$ factors logically ANDed with all possible combinations of said multiplier bits for $\pi/2^S$ increments of $\Theta$ in the angle range of 0 to $\pi$ radians in a first stage of said FPGA, where S is an integer;

c) loading said look-up-tables with the sums of sin $\Theta$ and cos $\Theta$ factors logically ANDed with all possible combinations of said multiplier bits for $\pi/2^{2S}$ increments of $\Theta$ in the angle range of 0 to $\pi/2^S$ radians in a second stage of said FPGA;

d) loading said look-up-tables with the sums of sin $\Theta$ and cos $\Theta$ factors logically ANDed with all possible combinations of said multiplier bits for $\pi/2^{3S}$ increments of $\Theta$ in the angle range of 0 to $\pi/2^{2}S$ radians in a third stage of said FPGA;

e) loading said look-up-tables with the sums of sin $\Theta$ and cos $\Theta$ factors logically ANDED with all possible combinations of said multiplier bits for $\pi/2^{4S}$ increments of $\Theta$ in the angle range of 0 to $\pi/2^{3S}$ radians in a fourth stage of said FPGA;

f) applying said input variables to respective parallel-to-serial registers for said first stage;

g) inputting the difference of serial register stored input variables as address inputs to the look-up-tables for said first stage;

h) scaling and accumulating the outputs of the look-up-tables of said first stage and applying the outputs of said first stage as address inputs to the look-up-tables in said second stage;

i) scaling and accumulating the outputs of the look-up-tables of said second stage and applying the outputs of said second stage as address inputs to the look-up-tables in said third stage;

j) scaling and accumulating the outputs of the look-up-table tables of said third stage and applying the outputs of said third stage as address inputs to the look-up-tables in said fourth stage; and k) storing real and imaginary trigonometric summed output of said look-up-tables of said stages in respective registers.

2. The method recited in claim 1 wherein said step g) comprises the steps of loading real components of said difference as addresses into a look-up-table and imaginary components of said difference as addresses into a look-up-table.

3. The method recited in claim 1 further comprising the steps of loading said look-up-tables with the sums of $\sin \Theta$ and $\cos \Theta$ factors logically ANDed with all possible combinations of said multiplier bits for $\pi/2^{5S}$ increments of $\Theta$ in the angle range of 0 to $\pi/2^{4S}$ radians in a fifth stage of FPGA.

4. A method of computing a rotation of a vector $X_o Y_o$ (where X and Y are complex) through a selected angle $\Theta$ using a digital device having distributed arithmetic table memory storing sums of trigonometric constant factors logically ANDed with combinations of multiplier bits; the method comprising the steps of:

a) determining the number of stages of vector rotation compatible with the capacity of said memory;

b) dividing said vector rotation into a plurality of successive angle rotation increments toward said selected angle $\Theta$, said number of increments being equal to the number of said stages, each said increment being of successively smaller increments of said selected angle $\Theta$ of rotation;

c) carrying out computations in each said stage using corresponding memory-stored sums of trigonometric constant factors ANDed with said multiplier bits, said factors being selected for the corresponding increments of angle of rotation for the respective stage; and d) scaling and accumulating the outputs of said table memory in each said stage and transferring the computational output of each such stage to the next successive stage as the input thereto and ultimately for the final stage as the computational output of said digital device.

5. A method for providing a gate-efficient implementation of the complex vector rotation defined by the term $(X+jy)e^{j\Theta}$ using a unitary field programmable gate array; the method comprising the following steps:

a) expressing the vector rotation in a sum of products form $(X+jy)ej\theta = x \cdot \cos \theta - y \cdot \sin \theta + j(y \cdot \cos \theta + x \cdot \sin \theta)$;

b) storing in distributed arithmetic look-up tables sums of $\sin \Theta$ and $\cos \Theta$ factors of said sum of products form for different values of $\theta$;

c) employing successive angle rotation increments by partitioning angle ranges into successively smaller sets of increments of angle $\Theta$ to reduce the look-up table memory required in step b);

d) providing real and imaginary input variable components X and Y in bit serial form to successive stages of said look-up tables, each with said successively smaller angle increments;

e) using logic gates within said field programmable gate array to address said look-up tables.

6. The method recited in claim 5 wherein step e) is carried out by using the input variable components to address the first stage of said look-up tables and then using the output of each stage of look-up tables to address each successive stage of look-up tables, the output of the last stage being the parameters of the complex vector rotation.

* * * * *